3,436,179
METHOD OF PREPARING SINTERED MASSES OF ALUMINUM NITRIDE

Shigetomo Matsuo, Tokyo, and Yosiaki Matsuki and Katsutoshi Komeya, Kawasaki-shi, Japan, assignors to Tokyo Shibaura Electric Co., Ltd., Kawasaki-shi, Japan, a corporation of Japan
Filed July 21, 1965, Ser. No. 473,800
Claims priority, application Japan, July 27, 1964, 39/42,014
Int. Cl. C01b *21/06;* B22f *1/00*
U.S. Cl. 23—192       2 Claims

ABSTRACT OF THE DISCLOSURE

Method of producing compact sintered aluminum nitride, comprising steps of pressure molding a mixture of alumina, carbon and aluminum powders into desired shape and gradually increasing temperature to about 1750° C. in a nitrogen atmosphere.

---

This invention relates to a method of preparing a sintered mass of aluminum nitride and more particularly to a method of preparing a sintered mass of aluminum nitride from a mixture of alumina powder, carbon powder and aluminum powder.

Generally, sintered masses or bodies are required to have high mechanical strength at elevated temperatures, low thermal expansion coefficient, excellent electric insulating properties, high corrosion resistance and the like properties.

It is recognized in the art that aluminum nitride has 2 or 3 times larger thermal conductivity, larger high temperature strength, and smaller thermal expansion coefficient than usual refractories for use at high temperatures and molded mass of alumina. Especially it has a good thermal shock resistance property so that it can well withstand a rapid change in temperature from 2200° C., for instance, to room temperature. In addition, aluminum nitride is difficult to be wetted by molten metals and hence is resistant to corrosion by metals. Further, the stability of aluminum nitride for atmospheres, such as nitrogen atmosphere, other inert atmospheres as well as hydrogen atmosphere is relatively high. Accordingly, aluminum nitride having such superior properties is useful as refractories for use at elevated temperatures.

According to one well known method of preparing sintered mass of aluminum nitride, carbon powder is incorporated to alumina powder, and the mixture is heated to an elevated temperature sufficient to nitrify aluminum whereby to form a sintered mass of aluminum nitride. The reaction of this method proceeds according to the following equation:

$$Al_2O_3 + 3C + N_2 \rightarrow 2AlN + 3CO$$

However, the sintered mass prepared by this method has large porosity and small mechanical strength. According to another method, aluminum nitride powder is shaped or molded into a desired shape and is then sintered in a nitrogen atmosphere to provide a sintered mass of aluminum nitride. Again the products of this method are not satisfactory in that their porosity is large and mechanical strength is small.

An object of this invention is to provide an improved sintered mass of aluminum nitride having small porosity and large mechanical strength.

Figure 1:
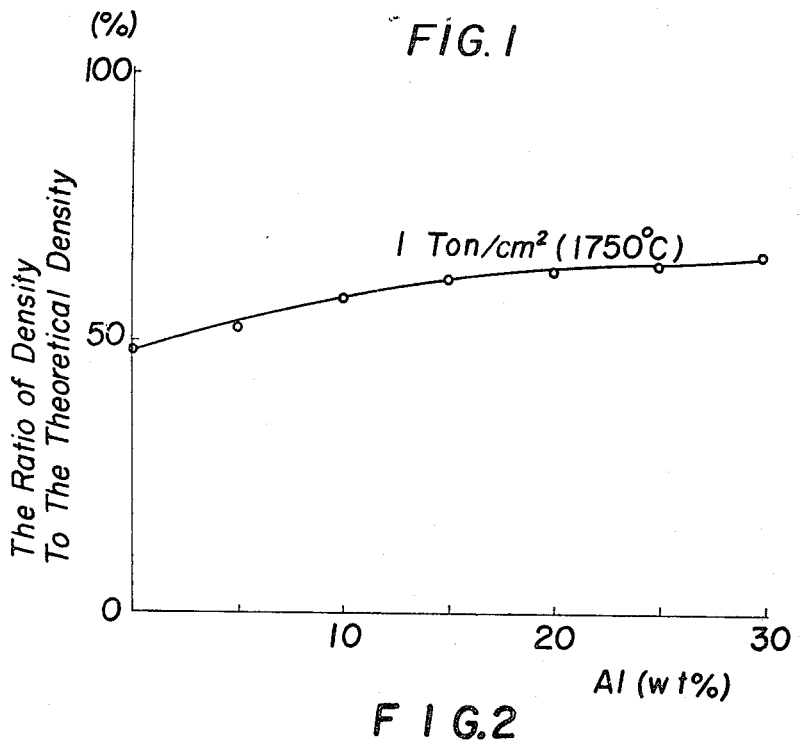
Figure 2:
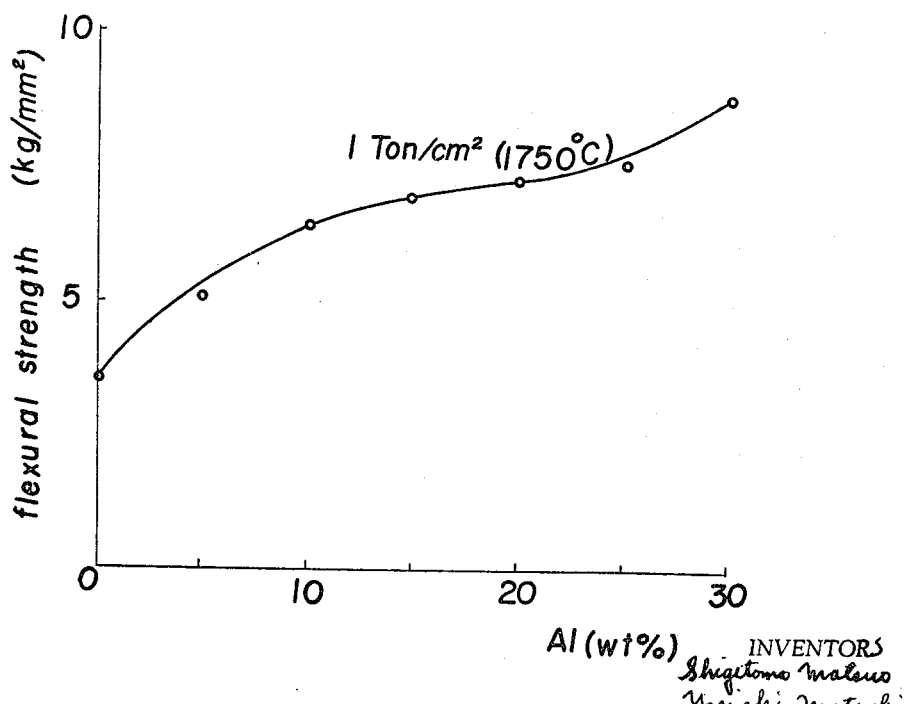

This invention may be more fully understood from the following detailed description taken in connection with the accompanying drawing in which:

FIG. 1 shows a curve to represent the relation between the density and the quantity of aluminum incorporated of a sintered mass of aluminum nitride prepared by the method of this invention; and FIG. 2 shows a curve to illustrate the relation between the flexural strength and the quantity of aluminum incorporated of a sintered mass of FIG. 1.

This invention is characterized by molding under pressure a mixture of powders of aluminum, carbon and alumina into a desired shape and then heating the shaped mass to a temperature sufficient to nitrify aluminum in an atmosphere of nitrogen.

Thus, we have succeeded in providing a sintered mass of aluminum nitride of excellent properties by cold forming under pressure a mixture of alumina powder, carbon powder and aluminum powder, and then heating the shaped mass to a temperature sufficient to nitrify in an atmosphere of nitrogen. By this process aluminum nitride is formed according to the following equations.

$$2Al + N_2 \rightarrow 2AlN \quad (1)$$
$$Al_2O_3 + 3C + N_2 \rightarrow 2AlN + 3CO \quad (2)$$

More specifically, with regard to the steps of temperature increase and reaction of this invention, in the low temperature zone or stage thereof the aluminum powder comprising a portion of the shaped mass melts and flows to fill up interstices in the mass, thus greatly decreasing the porosity thereof. Whereas in the high temperature zone or step the molten aluminum is subjected to the secondary nitrification as shown by Equation 1 to precede the reaction represented by Equation 2. In this manner a sintered mass of aluminum nitride is formed according to Equations 1 and 2.

Thus, according to the method of this invention it is possible to produce a sintered mass of aluminum nitride of high density and of greatly improved mechanical strength.

The following specific example is given by way of illustration, and not to be construed as limiting in any way the scope and spirit of the invention.

Example

Two hundred grams of a mixture comprising, at a weight ration of 3:1, alumina powder and carbon powder passing through a 100 mesh screen were put in a pot mill and mixed together for about 5 hours. To this powder mixture, aluminum powder passing through the 100 mesh screen was added at an increment of 5%, by weight, to provide 7 specimens. In other words, the amount of incorporation to the respective specimens was successively increased in the order to 0%, 5%, 10%, 15%, 25% and 30%. The final mixtures were respectively molded into a rod of 8 mm. diameter and 25 mm. length. Each of these molded specimens was placed in a furnace containing a nitrogen atmosphere and was increased in temperature from room temperature to 1750° C. during a period of about 70 minutes and maintained at this temperature from four hours to complete sintering. FIG. 1 is a graph on ordinates of the ratio (in percent) of density to the theoretical density of each sintered sample against the quantity (in weight percent) of aluminum powder incorporated. The flexural strength of each sintered sample was measured with the distance of span set to 10 mm. FIG. 2 represents the results of measurement, the ordinate representing the flexural strength in kg./mm.², and the abscissa representing the quantity of aluminum incorporated in weight percent.

As can be clearly noted from FIGS. 1 and 2 according to this invention it is able to provide a sintered mass of aluminum nitride having small porosity, high density and large mechanical strength by the incorporation of aluminum. For example, the porosity of a sample not containing aluminum is 49.5% whereas that of a sample containing 30% of aluminum is 65.5%, this corresponding to an increase of the density by 16.0%. Further, the flexural strength of a sample containing no aluminum is 3.5 kg./mm.$^2$ whereas that of a sample containing 30% of aluminum is 8.8 kg./mm.$^2$, which is about 2.5 times larger than the former. X-ray diffraction analysis of the respective samples which are incorporated with aluminum resulted a diffraction image of aluminum nitride in each case.

While the invention has been described in connection with a specific example it should be understood that many modifications may be made therein without departing from the true spirit and scope of the invention as defined in the appended claims.

What is claimed is:

1. A method of preparing a sintered mass of aluminum nitride, comprising the steps of: molding into a desired configuration a mixture of alumina powder, carbon powder and aluminum powder, increasing the temperature of said molded mixture over a time period of the order of 70 minutes to a nitriding temperature of the order of 1750° C. in a nitrogen atmosphere so as to melt said aluminum powder and cause the molten aluminum to fill the interstices between the alumina powder and the carbon powder, during the low temperature stage of said heating, and, to proceed to the reaction of the alumina, carbon and nitrogen in the higher temperature stage of said heating, thus producing aluminum nitride.

2. The method of preparing a sintered mass of aluminum nitride according to claim 1 wherein from 5 to 30% by weight of aluminum powder is incorporated to a mixture containing alumina powder and carbon powder at a ratio of 3 to 1 by weight.

References Cited

UNITED STATES PATENTS 3,108,887  10/1962  Lenie et al. _____ 23—204

FOREIGN PATENTS 1,228,120  8/1960  France.

EARL C. THOMAS, *Primary Examiner.*

HOKE S. MILLER, *Assistant Examiner.*

U.S. Cl. X.R.

23—204